(12) United States Patent
Long et al.

(10) Patent No.: US 11,723,354 B2
(45) Date of Patent: Aug. 15, 2023

(54) SYSTEM AND METHOD TO MITIGATE BOOM ASSEMBLY MOVEMENT

(71) Applicant: CNH Industrial America LLC, New Holland, PA (US)

(72) Inventors: Scott Allen Long, Plainfield, IL (US); Nathan Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 165 days.

(21) Appl. No.: 16/822,743

(22) Filed: Mar. 18, 2020

(65) Prior Publication Data
US 2021/0289766 A1    Sep. 23, 2021

(51) Int. Cl.
*A01M 7/00* (2006.01)
*A01C 23/00* (2006.01)
*B60G 17/016* (2006.01)

(52) U.S. Cl.
CPC .......... *A01M 7/0057* (2013.01); *A01C 23/008* (2013.01); *A01M 7/006* (2013.01); *A01M 7/0089* (2013.01); *B60G 17/0164* (2013.01)

(58) Field of Classification Search
CPC .. A01M 7/0089; A01M 7/0057; A01M 7/006; A01M 7/0071; A01M 7/0082; A01M 7/005; A01M 7/0053; B60G 17/0164; B60G 17/016; A01C 23/008; B05B 13/005
See application file for complete search history.

(56) References Cited

U.S. PATENT DOCUMENTS

| | | | |
|---|---|---|---|
| 4,220,998 A | 9/1980 | Kays | |
| 4,803,626 A | 2/1989 | Bachman et al. | |
| 4,905,897 A | 3/1990 | Rogers et al. | |
| 5,884,205 A | 3/1999 | Elmore et al. | |
| 5,995,895 A | 11/1999 | Watt et al. | |
| 5,995,902 A | 11/1999 | Monson | |
| 6,062,496 A | 5/2000 | Kinter | |
| 6,460,643 B1 | 10/2002 | Degelman | |

(Continued)

FOREIGN PATENT DOCUMENTS

EP    2829177    *    1/2015    .......... A01M 7/0057

OTHER PUBLICATIONS

Patriot Series Sprayer, Case IH, (15 pages) http://heartlandagequipment.com/wp-content/uploads/2016/10/Patriot_Brochure_spreads_08-16_CIH07271601.pdf.

*Primary Examiner* — Christopher R Dandridge
(74) *Attorney, Agent, or Firm* — Rebecca Henkel; Rickard DeMille

(57) ABSTRACT

An agricultural vehicle is provided herein that includes a chassis operably coupled with a powertrain control system. A boom assembly is operably coupled with the chassis. One or more nozzles is positioned along the boom assembly. A flow control assembly is configured to selectively dispense an agricultural product from a tank through the one or more nozzles. A controller is operably coupled with the powertrain control system and the boom assembly. The controller includes a processor and associated memory with the memory storing instructions that, when implemented by the processor, configure the controller to receive instructions to accelerate or decelerate the vehicle and alter a flow rate of the agricultural product through actuation of the flow control assembly in response to receiving instructions to accelerate or decelerate the vehicle.

11 Claims, 6 Drawing Sheets

(56) References Cited

U.S. PATENT DOCUMENTS

| | | | |
|---|---|---|---|
| 6,669,105 B2 | 12/2003 | Bryan et al. | |
| 6,678,580 B2 | 1/2004 | Benneweis | |
| 6,749,035 B2 | 6/2004 | Bundy | |
| 7,142,966 B2 * | 11/2006 | Saller | A01M 7/0089 |
| | | | 701/50 |
| 7,311,004 B2 | 12/2007 | Giles | |
| 7,388,662 B2 | 6/2008 | Cantin et al. | |
| 7,502,665 B2 | 3/2009 | Giles et al. | |
| 7,740,189 B2 | 6/2010 | Meyer et al. | |
| 8,065,054 B2 | 11/2011 | Tarasinski et al. | |
| 8,154,711 B1 | 4/2012 | Scheer | |
| 8,352,130 B2 * | 1/2013 | Mitchell | A01M 7/0089 |
| | | | 701/50 |
| 8,463,460 B2 | 6/2013 | Sprock et al. | |
| 8,869,908 B2 | 10/2014 | Zhu et al. | |
| 8,919,676 B2 | 12/2014 | Funseth | |
| 8,924,030 B2 | 12/2014 | Wendte et al. | |
| 9,532,563 B2 | 1/2017 | Arenson et al. | |
| 9,759,568 B2 | 9/2017 | Hillger et al. | |
| 10,149,468 B2 | 12/2018 | Crinklaw et al. | |
| 10,219,506 B2 | 3/2019 | Ni | |
| 10,244,747 B2 * | 4/2019 | Leeb | A01M 7/0057 |
| 10,279,366 B2 | 5/2019 | Larbi et al. | |
| 10,441,965 B2 | 10/2019 | Feldhaus et al. | |
| 2010/0250056 A1 | 9/2010 | Perkins | |
| 2011/0266365 A1 * | 11/2011 | Hrnicek | A01C 23/008 |
| | | | 239/164 |
| 2015/0375242 A1 * | 12/2015 | Haviland | B05B 1/262 |
| | | | 239/69 |
| 2016/0280221 A1 | 9/2016 | Jung et al. | |
| 2016/0368011 A1 * | 12/2016 | Feldhaus | B05B 12/124 |
| 2017/0274400 A1 | 9/2017 | Kowalchuk | |
| 2018/0220638 A1 | 8/2018 | Gresch et al. | |
| 2019/0150357 A1 | 5/2019 | Wu et al. | |
| 2021/0127567 A1 | 5/2021 | Loukili et al. | |

* cited by examiner

SYSTEM AND METHOD TO MITIGATE BOOM ASSEMBLY MOVEMENT

FIELD

The present disclosure generally relates to agricultural implements and, more particularly, to systems and methods for mitigating misapplications of an agricultural product during a spray operation, such as by monitoring one or more application variables and altering various components.

BACKGROUND

Various types of work vehicles utilize applicators (e.g., sprayers, floaters, etc.) to deliver an agricultural product to a ground surface of a field. The agricultural product may be in the form of a solution or mixture, with a carrier (such as water) being mixed with one or more active ingredients, such as a pesticide(s) (e.g., an herbicide(s), insecticide(s), rodenticide(s), etc.) and/or a nutrient(s).

The applicators may be pulled as an implement or self-propelled, and can include a tank, a pump, a boom assembly, and a plurality of nozzles carried by the boom assembly at spaced locations. The boom assembly can include a pair of boom arms, with each boom arm extending to either side of the applicator when in an unfolded state. Each boom arm may include multiple boom sections, each with a number of spray nozzles (also sometimes referred to as spray tips).

The spray nozzles on the boom assembly disperse the agricultural product carried by the applicator onto a field. During a spray operation, however, various factors may affect a quality of application of the agricultural product to the field. Accordingly, an improved system and method for monitoring the quality of application of the agricultural product to the field and manipulating various components to mitigate application errors would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural vehicle that includes a chassis operably coupled with a powertrain control system. A boom assembly is operably coupled with the chassis and one or more nozzles positioned along the boom assembly. A flow control assembly may be configured to selectively dispense an agricultural product from a tank through the one or more nozzles. A controller may be operably coupled with the powertrain control system and the boom assembly. The controller includes a processor and associated memory, the memory storing instructions that, when implemented by the processor, configure the controller to receive instructions to accelerate or decelerate the vehicle; increase a flow rate of the agricultural product through actuation of the flow control assembly in response to receiving instructions to accelerate the vehicle; and decrease the flow rate of the agricultural product through actuation of the flow control assembly in response to receiving instructions to decelerate the vehicle.

In some aspects, the present subject matter is directed to an agricultural vehicle that includes a chassis operably coupled with a powertrain control system. A boom assembly may be operably coupled with the chassis and one or more nozzles may be positioned along the boom assembly. A pump may be configured to selectively dispense an agricultural product from a tank through the one or more nozzles. A controller can be operably coupled with the powertrain control system and the boom assembly. The controller can include a processor and associated memory, the memory storing instructions that, when implemented by the processor, configure the controller to alter a stiffness of the boom assembly or alter a flow rate of the pump in response to receiving instructions to accelerate or decelerate the vehicle.

In some aspects, the present subject matter is directed to a method for mitigating misapplications of an agricultural product during a spray operation. In some embodiments, the method includes receiving data from one or more sensors that is indicative of an application variable contributing to an overall spray quality index of a spray operation. The method also includes monitoring the application variable associated with the overall spray quality index based on the data received from the one or more sensors. Further, the method includes altering at least one of a vehicle speed, an acceleration of the vehicle, a deceleration of the vehicle, a vehicle direction, or an application rate of a pump based on a change in the overall spray quality index.

These and other features, aspects, and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
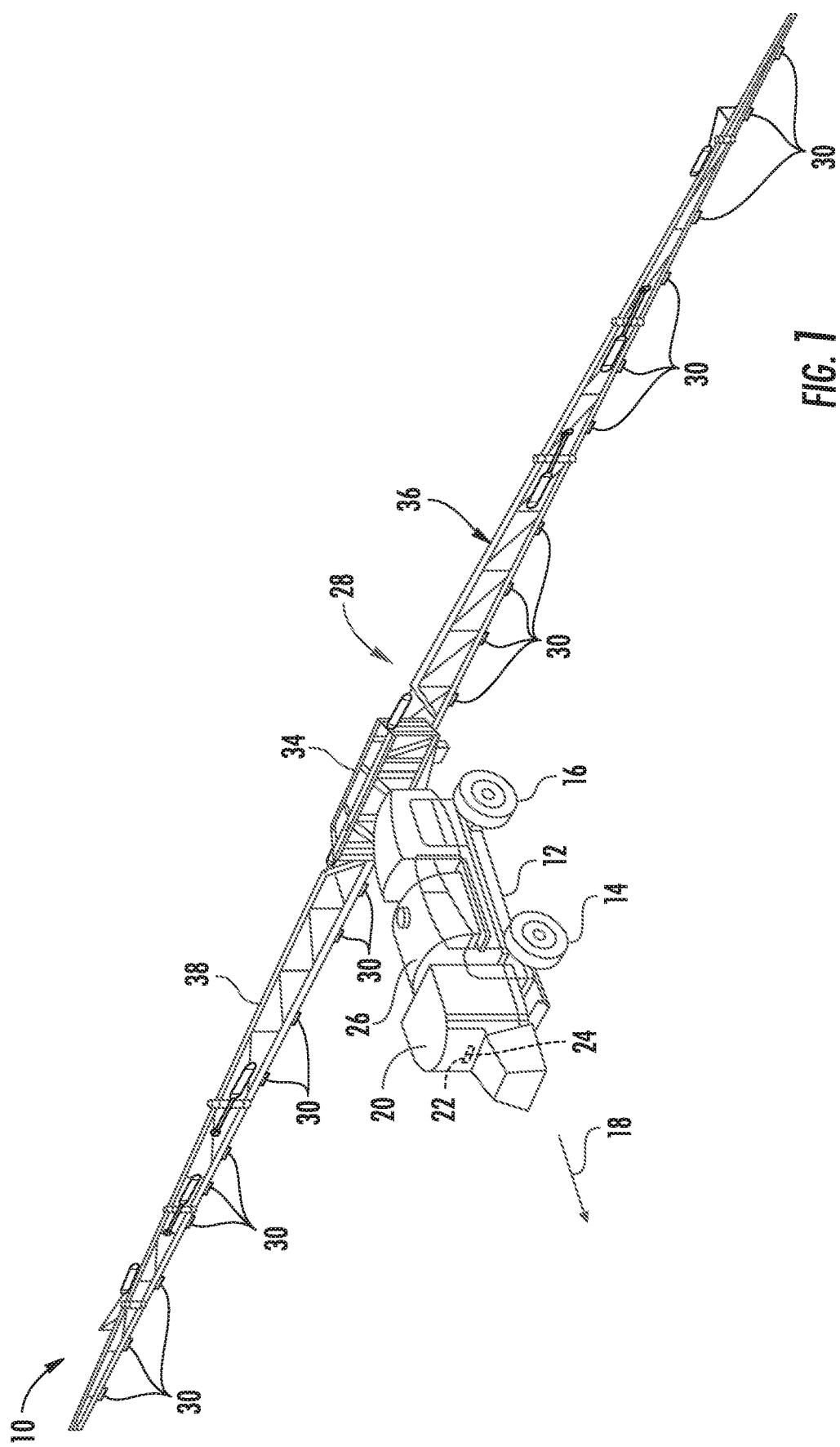
FIG. 1 illustrates a perspective view of some embodiments of a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of some embodiments can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for mitigating misapplications of an agricultural product during a spray operation, such as by monitoring one or more application variables and altering various components. In several embodiments, a boom assembly may be configured to couple with a work vehicle. The vehicle and/or the boom assembly includes a plurality of spray nozzles that disperse an agricultural product onto a field. During a spray operation, various application variables may affect a spray quality index of application of the agricultural product to the field are monitored. The spray quality index can be defined as a predefined application rate/range that estimates whether a spray operation has led to appropriate coverage of a field, or a portion of the field, by the agricultural product based on a summation of monitored application variables. In some instances, the spray quality index can be a scaled integer based on the deviations of each variable from an optimal threshold or range defined between an upper threshold and a lower threshold for that respective variable to determine whether the agricultural product was appropriately applied or misapplied to various portions of the field.

In several embodiments, the one or more application variables that may affect the spray quality index can include at least one of a nozzle tip size and style, which agricultural product is being applied, an incorrect agricultural product application rate, inclement weather as determined by meeting one or more criteria, an agricultural product flow rate or pressure deviating from a predefined range, boom assembly movement (e.g., jounce) exceeding a movement range, a vehicle exceeding a predefined speed, a vehicle acceleration/deceleration deviating from a predefined range, a turning, radius exceeding predefined criteria, and/or any other variable.

In several embodiments, to monitor the application variables, one or more sensors may be positioned on the vehicle, the boom assembly, or any other location for monitoring a condition that affects the overall spray operation of the agricultural product. A controller is communicatively coupled to the one or more sensors and includes a processor and associated memory. The memory can store instructions that, when implemented by the processor, configure the controller to alter various components of the vehicle, such as a vehicle suspension, an agricultural product application system, a powertrain control system, steering system, and/or any other component of the vehicle. By adjusting any one or more of these systems, the controller may mitigate spray quality index deviations when potentially adverse conditions exist.

Figure 2:
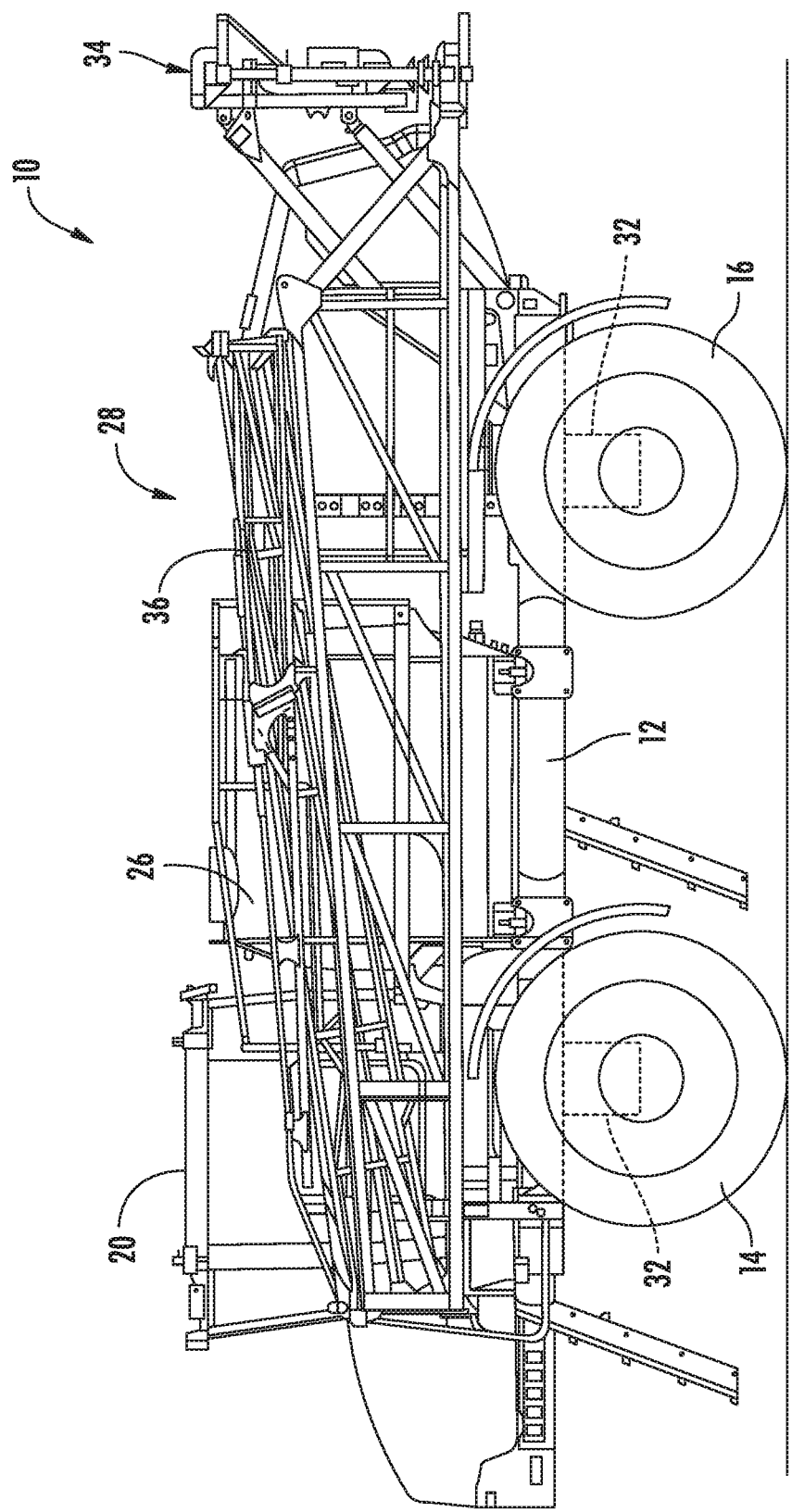
FIG. 2 illustrates a side view of the work vehicle in accordance with aspects of the present subject matter.

Referring now to FIGS. 1 and 2, a work vehicle 10 is generally illustrated as a self-propelled agricultural applicator. However, in alternate embodiments, the work vehicle 10 may be configured as any other suitable type of work vehicle 10 configured to perform agricultural spray operations, such as a tractor or other vehicle configured to haul or tow an application implement.

In various embodiments, the work vehicle 10 may include a chassis 12 configured to support or couple to a plurality of components. For example, front and rear wheels 14, 16 may be coupled to the chassis 12. The wheels 14, 16 may be configured to support the work vehicle 10 relative to a ground surface and move the work vehicle 10 in a direction of travel (e.g., as indicated by arrow 18 in FIG. 1) across a field or a ground surface. In this regard, the work vehicle 10 may include a power plant, such as an engine, a motor, or a hybrid engine-motor combination, to move the vehicle 10 along a field.

The chassis 12 may also support a cab 20, or any other form of operator's station for permitting the operator to control the operation of the work vehicle 10. For instance, as shown in FIG. 1, the work vehicle 10 may include a human-machine interface (HMI) 22 for displaying messages and/or alerts to the operator and/or for allowing the operator to interface with the vehicle's controller through one or more user input devices 24 (e.g., levers, pedals, control panels, buttons, and/or the like).

The chassis 12 may also support one or more tanks, such as a rinse tank and/or a product tank 26, and a boom assembly 28 mounted to the chassis 12. The product tank 26 is generally configured to store or hold an agricultural product, such as a pesticide(s) (e.g., an herbicide(s), insecticide(s), rodenticide(s), etc.) and/or a nutrient(s). The agricultural product is conveyed from the product tank 26 through plumbing components, such as interconnected pieces of tubing, for release onto the underlying ground surface (e.g., plants and/or soil) through one or more nozzles 30 mounted on the boom assembly 28.

In some embodiments, to improve the agricultural product application quality and/or operator comfort, the vehicle 10 can be equipped with a passive, semi-active, or active vehicle suspension 32 to dampen movement of the vehicle 10 and/or the boom assembly 28 while operating the vehicle 10 and/or the boom assembly 28.

As shown in FIGS. 1 and 2, the boom assembly 28 can include a frame 34 that supports first and second boom arms 36, 38, which may be orientated in a cantilevered nature. The first and second boom arms 36, 38 are generally movable between an operative or unfolded position (FIG. 1) and an inoperative or folded position (FIG. 2). When distributing product, the first and/or second boom arm 36, 38 extends laterally outward from the work vehicle 10 to cover wide swaths of the underlying ground surface, as illustrated in FIG. 1. However, to facilitate transport, each boom arm 36, 38 of the boom assembly 28 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
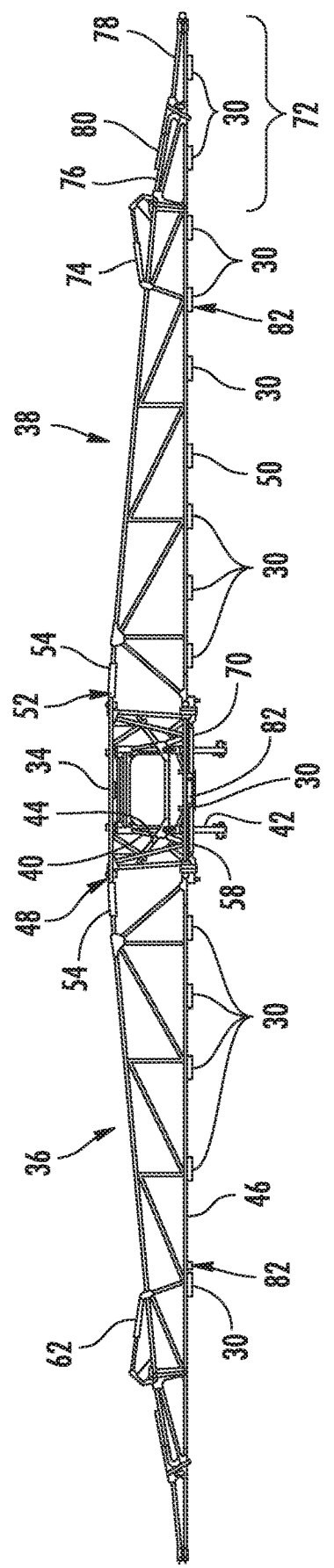
FIG. 3 illustrates a rear view of a boom assembly in accordance with aspects of the present subject matter.

Referring to FIG. 3, the boom assembly 28 includes a mast 40 coupled to a frame 34 that, in combination, can support the boom assembly 28 on the vehicle 10. In some embodiments, such as the one illustrated in FIG. 3, the mast 40 is configured to couple to the work vehicle 10 (FIG. 2) via a linkage assembly 42 to transfer a load of the frame 34 to the mast 40. Furthermore, a boom suspension 44 can extend between the frame 34 and the mast 40 and can be configured to dampen movement of the frame 34 relative to the mast 40, thereby providing a stable platform for the boom assembly 28. In some examples, the boom suspension 44 can include one or more actuators that can be configured to mechanically interconnect the frame 34 to the mast 40. The one or more actuators may be capable of generally leveling the boom assembly 28 relative to the ground surface. In addition to aiding in leveling the boom assembly 28, the adjustable suspension can also provide various damping levels and/or rigidly couple the frame 34 and the mast 40 to one another.

In some examples, an inner section 46 of the first boom arm 36 is pivotally coupled to a first lateral side portion 48 of the frame 34, and an inner section 50 of the second boom arm 38 is coupled to an opposite, second lateral side portion 52 of the frame 34. In this configuration, the first and second boom arms 36, 38 may be folded forwardly or rearwardly from the illustrated operative position to an inoperative position that reduces the overall width of the vehicle 10.

In some examples, such as the embodiment illustrated in FIG. 3, the boom assembly 28 includes a positioning assembly 54 operably coupled to the frame 34 and/or the first and second boom arms 36, 38. The positioning assembly 54 may be configured to independently move each of the first and second boom arms 36, 38 between the extended and folded positions. For example, in some embodiments, the first boom arm 36 includes an actuating device 58 (e.g., electromechanical actuator, hydraulic cylinder and/or pneumatic cylinder) extending between the inner section 46 of the first boom arm 36 and the frame 34.

The first boom arm 36 also includes an outer portion 60 having a peripheral actuating device 62. As illustrated, the outer portion 60 is coupled to the inner section 46 by a pivotal joint. Like the actuating device 58, the peripheral actuating device 62 may be an electromechanical actuator, hydraulic cylinder and/or pneumatic cylinder. In examples utilizing a hydraulic, and/or pneumatic cylinder, the cylinder may be configured to displace a piston rod extending from the device 62. Retracting the piston rod of the device 62 will cause the outer portion 60 to rotate upwardly from the illustrated product distribution/operative position to an inoperative position. However, it will be appreciated that alternative embodiments may employ outer portions configured to rotate forwardly or rearwardly to the inoperative position.

In the illustrated embodiment, the outer portion 60 includes an outer section 64, a breakaway section 66, and a biasing member 68. The outer section 64 extends between the inner section 46 and the breakaway section 66. The breakaway section 66 is pivotally coupled to the outer section 64 by a joint, and the biasing member 68 is configured to urge the breakaway section 66 toward the illustrated operative position. In this configuration, contact between the breakaway section 66 and an obstruction will drive the breakaway section to rotate. After the boom has passed the obstruction, the biasing member 68 will urge the breakaway section back to the operative position.

The structure of the second boom arm 38 is similar to the structure of the first boom arm 36. For instance, the second boom arm 38 includes an actuating device 70 (e.g., electromechanical actuator, hydraulic cylinder and/or pneumatic cylinder) extending between the inner section 50 and the frame 34. The second boom arm 38 also includes an outer portion 72 having a peripheral actuating device 74. As illustrated, the outer portion 72 is coupled to the inner section 50 by a pivotal joint. Like the device 70, the peripheral actuating device 74 may be an electromechanical actuator, hydraulic cylinder and/or pneumatic cylinder configured to rotate the outer portion 72 relative to the inner section 50 by electromechanically rotating the outer portion 72 and/or displacing a piston rod extending from the peripheral actuating device 74. Retracting the piston rod of the peripheral actuating device 74 will cause the outer portion 72 to rotate upwardly from the illustrated product distribution/operative position to an inoperative position.

In embodiment illustrated in FIG. 3, the outer portion 72 also includes an outer section 76, a breakaway section 78, and a biasing member 80. The outer section 76 extends between the inner section 50 and the breakaway section 78. The breakaway section 78 is pivotally coupled to the outer section 76 by a joint, and the biasing member 80 is configured to urge the breakaway section 78 toward the illustrated operative position. In this configuration, contact between the breakaway section 78 and an obstruction will drive the breakaway section to rotate. After the boom has passed the obstruction, the biasing member 80 will urge the breakaway section back to the operative position. Although the boom assembly 28 is shown in FIG. 3 as including first and second boom arms 36, 38 each having an inner section 46, 50 and an outer portion 60, 72 coupled to each side portion of the frame 34, the boom assembly 28 may generally have any suitable number of boom arms 36, 38.

With further reference to FIG. 3, in various embodiments, one or more sensors 82 may be installed or otherwise positioned on the vehicle 10 and/or the boom assembly 28. In some instances, the sensors 82 are configured to capture data indicative of an orientation or position of the boom assembly 28 relative to the ground surface and/or data associated with one or more application variables that may affect a spray quality index. As provided herein, the spray quality index can be defined as a predefined application rate/range that estimates whether a spray operation has led to appropriate coverage of a field, or a portion of the field, by the agricultural product based on a summation of monitored application variables. In some instances, the spray quality index can be a scaled integer based on the deviations of each variable from an optimal threshold or range for that respective variable to determine whether the agricultural product was appropriately applied or misapplied to various portions of the field.

Figure 4:
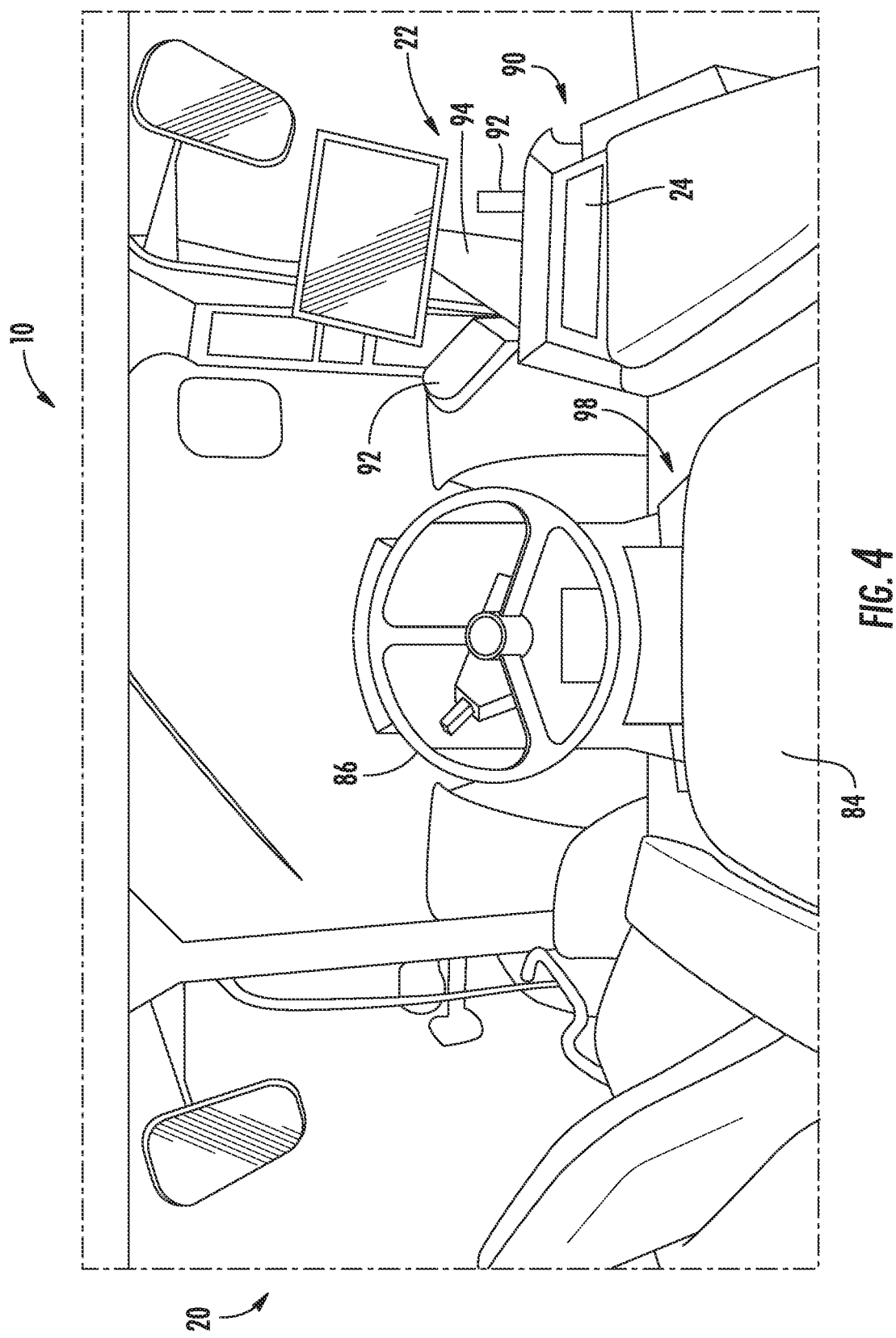
FIG. 4 illustrates a partial perspective view of a cab of the vehicle in accordance with aspects of the present subject matter.

Referring now to FIG. 4, an interior of the cab 20 of the work vehicle 10 may include a seat 84, on which the operator sits when operating the vehicle 10. In various embodiments, a steering wheel 86 is located near the seat 84, so as to be within arm's reach of the operator when the operator is seated. Though a steering wheel 86 is included in the illustrated embodiment, other embodiments of the vehicle 10 may include other devices for receiving steering inputs from the operator. For example, in place of a steering wheel 86, the cab 20 may have left/right control bars, a hand controller, pedals, or another suitable device for receiving steering inputs.

Also located near the seat 84, at the operator's feet can be one or more pedals 88. The pedals 88 may be configured to receive input from the operator for controlling the vehicle speed. For example, the pedals 88 may control a throttle, brakes, a clutch, other suitable systems, or a combination thereof. In other embodiments, pedals 88 may be used for steering inputs. Further, in embodiments in which the vehicle 10 is semi-autonomous or fully autonomous, the steering wheel 86 and/or the pedals 88 may be omitted.

Along one or both sides of the seat 84 may be an armrest 90. The armrest 90 may include one or more hand manipulation devices 92, the HMI 22, supported by an interface mount 94, and/or one or more user input devices 24. The HMI 22 may be used to present information to the operator, such as vehicle information (e.g., ground speed, oil pressure, engine temperature, etc.), boom assembly operations information (e.g., nozzle in use, agricultural product flow rate), and manufacturer proprietary systems information (e.g. Advanced Farming Systems (AFS) information, including yield maps, position data, etc.). In addition, the HMI 22 may also be capable of presenting and displaying data associated with one or more application variables that can affect the application of the agricultural product. For instance, the one or more application variables that may affect the spray operation can include at least one of a nozzle tip size and style, which agricultural product is being applied, an incorrect agricultural product application rate, inclement weather as determined by meeting one or more criteria, an agricultural product flow rate or pressure deviating a predefined range, boom assembly movement (e.g., jounce) exceeding a movement range, the vehicle 10 exceeding a predefined speed, a vehicle acceleration/deceleration deviating from a predefined range, or a turning radius exceeding predefined criteria.

Figure 5:
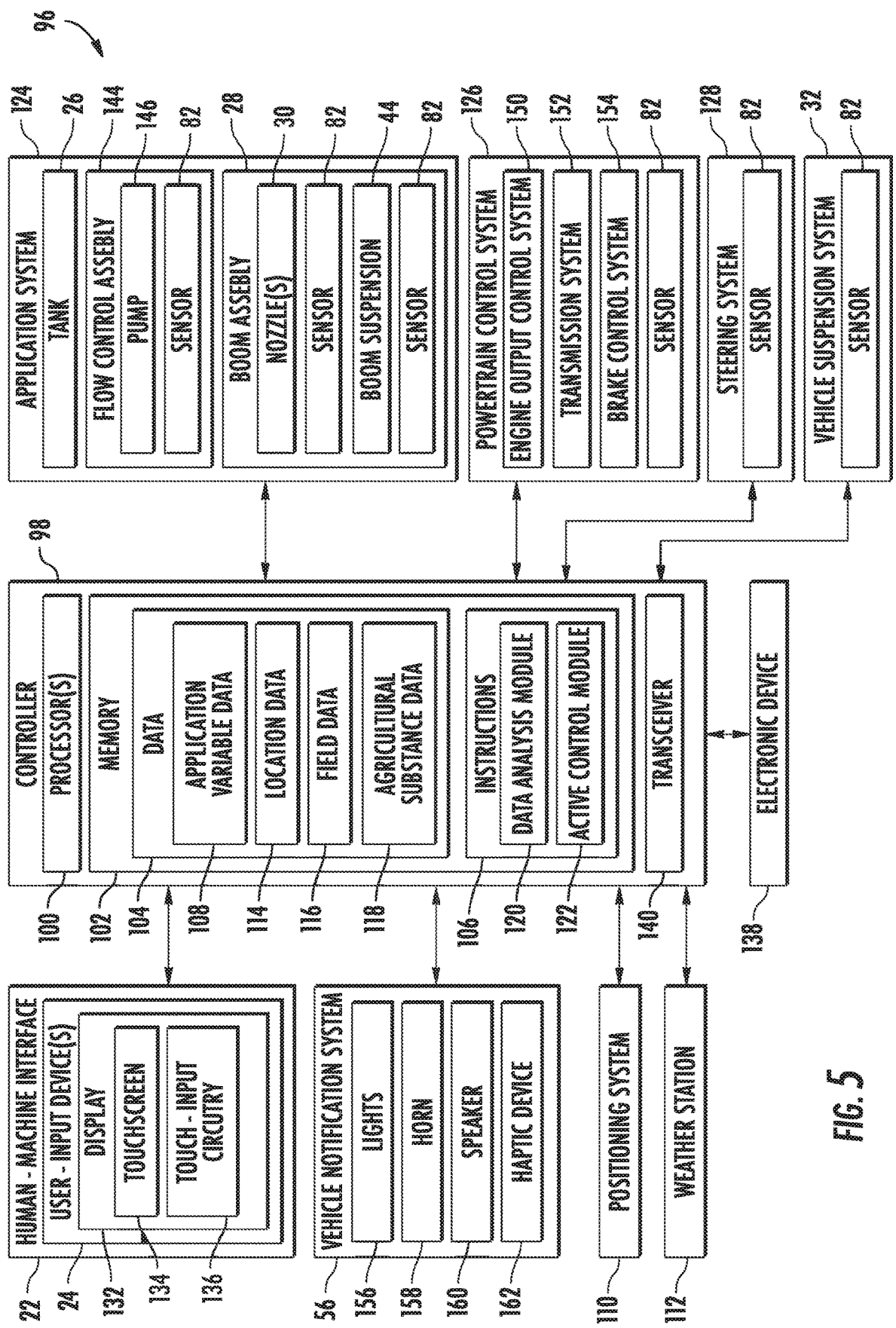
FIG. 5 illustrates a block diagram of components of the agricultural applicator system in accordance with aspects of the present subject matter.

Referring now to FIG. 5, a schematic view of some embodiments of a system 96 for mitigating misapplications of an agricultural product during a spray operation is illustrated in accordance with aspects of the present subject matter. In general, the system 96 will be described herein with reference to the work vehicle 10 and the boom assembly 28 described above with reference to FIGS. 1-4. However, it should be appreciated that the disclosed system 96 may generally be utilized with work vehicles 10 having any suitable vehicle configuration and/or implements having any suitable implement configuration.

In several embodiments, the system 96 may include a controller 98 and various components configured to be communicatively coupled to the controller 98. As will be described in greater detail below, the controller 98 may be configured to receive data from various components to monitor one or more application variables and/or an overall spray quality index. For some spray operations, the one or more application variables are generally optimized to reduce application overlap, under application, or over application during the spray operation. Accordingly, a deviation of a single application variable from a desired condition or range can cause the active ingredient to be improperly applied to the field. Thus, to mitigate misapplications of an agricultural product during a spray operation, the controller 98 may alter or manipulate the various components thereby maintaining the spray quality index within a predefined range.

In general, the controller 98 may correspond to any suitable processor-based device(s), such as a computing device or any combination of computing devices. Thus, as shown in FIG. 5, the controller 98 may generally include one or more processor(s) 100 and associated memory devices 102 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 102 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 102 may generally be configured to store information accessible to the processor(s) 100, including data that can be retrieved, manipulated, created and/or stored by the processor(s) 100 and instructions 106 that can be executed by the processor(s) 100.

In several embodiments, the data may be stored in one or more databases 104. For example, the memory device 102 may include an application variable database 108 for storing application variable data 108 received from one or more sensors 82 for subsequent processing and/or analysis. Moreover, in addition to the initial or raw sensor data received from the sensors 82, the positioning system 110, and/or the weather station 112, final or post-processing application variable data 108 (as well as any inter mediate application variable data 108 created during data processing) may also be stored within the application variable database 108. For example, the controller 98 may be configured to analyze the data received from the sensors 82, the positioning system 110, and/or the weather station 112 using one or more data processing techniques or algorithms to determine a spray quality index for the analyzed sections of the field.

Additionally, in several embodiments, the memory device 102 may also include a location database 114 storing location information about the work vehicle 10 and/or the boom assembly 28. Specifically, as shown in FIG. 5, the controller 98 may be communicatively coupled to a positioning system(s) 110 installed on or within the work vehicle 10 and/or on or within the boom assembly 28. In some embodiments, the positioning system(s) 110 may be configured to determine the location of the work vehicle 10 and/or the boom assembly 28 by using a GPS system, a Galileo positioning system, the Global Navigation satellite system (GLONASS), the BeiDou Satellite Navigation and Positioning system, a dead reckoning system, and/or the like. In such embodiments, the location determined by the positioning system(s) 110 may be transmitted to the controller 98 (e.g., in the form location coordinates) and subsequently stored within the location database 114 for subsequent processing and/or analysis. In various embodiments, the controller 98 may be configured to receive location data from the positioning system 110 associated with the boom assembly 28 and alter the stiffness of the boom assembly 28 or alter the flow rate of the product pump 146 in response to receiving location data indicating an upcoming change in vehicle speed or acceleration. It should be appreciated that, in some embodiments, a first positioning system(s) 110 may be provided on and/or within the work vehicle 10 while a separate, second positioning system(s) 110 may be provided on and/or within the boom assembly 28.

In several embodiments, the location data stored within the location database 114 may also be correlated to the application variable data 108 stored within the application variable database 108. For instance, in some embodiments, the location coordinates derived from the positioning system(s) 110 and the application variable data 108 captured by the sensors 82 and/or the weather station 112 may both be time-stamped. In such embodiments, the time-stamped data may allow each individual set of data captured by the sensors 82 and/or the weather station 112 to be matched or correlated to a corresponding set of location coordinates received from the positioning system(s) 110, thereby allowing the precise location of the portion of the field associated with a given set of application variable data 108 to be known (or at least capable of calculation) by the controller 98.

In some embodiments, the memory device 102 may include a field database 116 for storing information related to the field, such as field map data 116. In such embodiments, by matching each set of application variable data 108 captured by the sensors 82 and/or the weather station 112 to a corresponding set of location coordinates, the controller 98 may be configured to generate or update a corresponding field map associated with the field, which may then be stored within the field database 116 for subsequent processing and/or analysis. For example, in instances in which the controller 98 includes a field map stored within the field database 116, the application variable data 108 captured by the sensors 82, the positioning system 110, and/or the weather station 112 may be mapped or otherwise correlated to the corresponding locations within the field map. Alternatively, based on the location data and the associated sensor data, the controller 98 may be configured to generate a field map that includes the geo-located application variable associated therewith.

In order to generate the spray quality index, in some embodiments, the memory device 102 may also include an agricultural product database 118 that stores product information. The product information may include various information regarding the optimal conditions and rates of application for an individual product that is to be applied to the field. In some instances, the product information may be preloaded or sent to the vehicle 10 via wired or wireless communication therewith. Additionally, or alternatively, the product information may be manually inputted into the database 118.

With further reference to FIG. 5, in several embodiments, the instructions 106 stored within the memory device 102 of the controller 98 may be executed by the processor(s) 100 to implement a data analysis module 120 or an active control module 122. In general, the data analysis module 120 may be configured to analyze the initial or raw sensor data captured by the sensors 82, the positioning system 110, and/or the weather station 112 to allow the controller 98 to estimate the spray quality index of one or more sections of the field. For instance, the data analysis module 120 may be configured to execute one or more suitable data processing techniques or algorithms that allows the controller 98 to accurately and efficiently analyze the sensor data, such as by applying corrections or adjustments to the data based on the sensor type, sensor resolution, and/or other parameters associated with the sensors 82, the positioning system 110, and/or the weather station 112, by filtering the data to remove outliers, by implementing sub-routines or intermediate calculations to estimate the spray quality index based on the one or more application variables, and/or by performing any other desired data processing-related techniques or algorithms.

The active control module 122 may provide instructions for various other components communicatively coupled with the controller 98 based on the results of the data analysis module 120. For example, the active control module 122 may provide notification instructions to the vehicle notification system 56, the HMI 22, and/or a remote electronic device 138. The active control module 122 may also be capable of altering a system or component of the vehicle 10 in response to one or more application variables deviating from a defined range or threshold. For instance, in some embodiments, the controller 98 may adjust an agricultural product application system 124 by altering stiffness of the boom assembly 28 or a flow rate of the product pump 146 may be altered in response to receiving instructions to accelerate or decelerate the vehicle 10 and/or one or more of the application variables exceeding a predefined threshold and/or deviating from a predefined range. Additionally, or alternatively, in some examples, the active control module 122 may deactivate the pump 146 thereby pausing application of the agricultural product in response to determining that inclement weather conditions exist or adjust a spray nozzle 30 that is fluidly coupled with the product tank 26 based on the detected application variables.

In addition, various other components may be adjusted by the active control module 122 in response to one or more application variables deviating from a defined range or threshold. For example, the controller 98 may also adjust or alter the powertrain control system 126, the steering system 128, and/or the vehicle suspension 32 when one or more of the application variables deviates from a predefined threshold and/or a predefined range.

In some examples, the HMI 22 may include a display 132 having a touchscreen 134 mounted within a cockpit module, an instrument cluster, and/or any other location within the vehicle 10. The display 132 may be capable of displaying information related to the application variables and/or accept inputted ranges or thresholds for each variable. For example, the HMI 22 may include an input device in the form of circuitry 136 within the touchscreen to receive an input corresponding with a location over the display 132. Other forms of input, including one or more joysticks, digital input pads, or the like can be used in place or in addition to touchscreen 134.

In some embodiments, the vehicle notification system 56 may prompt visual, auditory, and tactile notifications and/or warnings when one or more variables deviates from a predefined range, the spray quality index deviates from a predefined range, and/or one or more functions of the vehicle 10 or the boom assembly 28 is altered by the controller 98. For instance, vehicle brake lights 156 and/or vehicle emergency flashers may provide a visual alert. A vehicle horn 158 and/or speaker 160 may provide an audible alert. A haptic device 162 integrated into the steering wheel 86, the seat 84, the armrest 90, and/or any other location may provide a tactile alert. Additionally, the controller 98 and/or the vehicle notification system 56 may communicate with the HMI 22 of the vehicle 10. In addition to providing the notification to the operator, the controller 98 may additionally store the location of the vehicle 10 at the time of the notification. The stored location may be displayed through a field map to illustrate locations of the field in which an agricultural product may have been misapplied.

Referring still to FIG. 5, as provided herein, the vehicle 10 may include at least one mobile weather station 112 that can be mounted to the vehicle 10, the boom assembly 28, and/or other locations. The mobile weather station 112 can contain any of the sensors 82 that are normally found on a stationery weather station that monitor one or more weather criteria, such as temperature, wind speed, wind direction, relative humidity, barometric pressure, cloud cover, and trends thereof. During operation, if one or more of the criteria changes, such as the wind direction or speed changes, the changes can reduce the ability to uniformly apply the agricultural product to the field. By using the information provided by the mobile weather station 112, the system 96 can determine when inclement weather exists for the spray operation. The determination of inclement weather may be based on a combination of the detected weather conditions in combination with the other application variables. For instance, when applying a smaller or finer agricultural product, a lower wind speed may lead to an incorrect application when compared to an agricultural product having a larger size. In such instances, the maximum wind speed allowed during application of the various products may differ. Likewise, any other weather criteria may also be altered based on the remaining application variables. If it is determined that inclement weather exists, the controller 98 may alter or adjust any component of the vehicle 10 and/or the boom assembly 28 based on the weather. For example, in some embodiments, the pump 146 may pause operation thereby halting application of the agricultural product to the field and/or adjust a flow rate to compensate for the inclement weather.

Further, the system 96 may communicate via wired and/or wireless communication with one or more remote electronic devices 138 through a transceiver 140. The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The electronic device 138 may also include a display for displaying information to a user. For instance, the electronic device 138 may display one or more user interfaces and may be capable of receiving remote user inputs to set a predefined threshold for any of the application variables and/or to input any other information, such as the agricultural product to be used in a spray operation. In addition, the electronic device 138 may provide feedback information, such as visual, audible, and tactile alerts and/or allow the operator to alter or adjust one or more components of the vehicle 10 or the boom assembly 28 through usage of the remote electronic device. It will be appreciated that the electronic device 138 may be any one of a variety of computing devices and may include a processor and memory. For example, the electronic device 138 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

With further reference to FIG. 5, the agricultural product application system 124 may be configured to dispense a product from the product tank 26 to the field through a nozzle assembly that is positioned at least partially along the boom assembly 28. In some embodiments, a flow control assembly 144 can include a pump 146, restrictive orifices, valves, and/or the like to regulate the flow of agricultural product from the product tank 26 to the nozzle assembly. In some cases, the flow control assembly 144 may regulate flow based on an analysis of one or more application variables. For instance, in cases where the vehicle 10 has received an instruction to accelerate, the controller 98 may increase a flow rate of the agricultural product from the product tank 26 to the one or more nozzles 30 through actuation of the flow control assembly 144 to assist in preventing an underapplication of agricultural product to the underlying field. Alternatively, in cases where the vehicle 10 has received an instruction to decelerate, the controller 98 may decrease a flow rate of the agricultural product from the product tank 26 to the one or more nozzles 30 through actuation of the flow control assembly 144 to assist in preventing an overapplication of agricultural product to the underlying field. Moreover, other components of the flow control assembly 144 (e.g., restrictive orifices, valves, and the like) may be controlled via the controller 98 to achieve a predefined exit flow rate at the nozzles 30. In some embodiments, various portions of the boom assembly 28 can include individual flow control assemblies 60 configured to enhance flow for that portion of the boom assembly 28.

To monitor the flow control assembly 144, various sensors 82, such as a flow sensor, a pressure sensor, and/or any other sensor may be utilized. For example, in some embodiments, a flow rate of agricultural product from the product tank 26 to the nozzle assembly is detected by the flow sensor. Likewise, a distribution line pressure may be detected by the pressure sensor to detect potential errors in operation. For example, in some embodiments, each nozzle 30 within the nozzle assembly dispenses product at a dispense rate proportional to the distribution line pressure. If the measured total flow is not equal to the total flow expected, then it is likely that one or more nozzles 30 may be worn, damaged, or plugged. In such situations, a notification may be provided and/or the nozzle assembly may place a different nozzle 30 in communication with the product tank 26.

In various embodiments, the nozzle assembly can include a series of commonly designed nozzles 30, variously designed nozzles 30, and/or a turret of nozzles 30 that may be adjusted based on the desired spray operation and agricultural product. In examples including a turret of nozzles 30, the turret enables an orifice size of the nozzle 30 to be easily changed without tools by rotating the turret or a plate to the desired orifice size in an efficient manner or alter fluid coupling from a first nozzle 30 to a second nozzle 30 housed wherein the turret. Each nozzle 30 may be adjusted in conjunction with the other nozzles 30 and/or independently of the other nozzles 30 positioned on the boom assembly 28. In addition, the adjustment of the nozzles 30 may be manually adjusted and/or the controller 98 may adjust one or more nozzles 30 without input from the operator.

One or more sensors 82 may be operably coupled with the nozzles 30 to capture data related to a flow rate from the nozzle 30, a blockage of the nozzle 30, an agricultural product being dispensed from the nozzle 30, a specific nozzle 30 in communication with the product tank 26, and/or any other information. Based on the captured data from the sensor 82, the nozzles 30 can be altered such that the agricultural product is dispensed at a desired spray angle, with a desired droplet size to encourage overlap, and/or with a desired dispersion to improve the application (or the spray quality index) of the agricultural product to a target area of the agricultural field.

In operation, speed variations, steering variations, weather variations, and/or terrain variations may cause the boom assembly 28 to move from its neutral position. Accordingly, one or more sensors 82 may be operably coupled with the vehicle 10 and/or the boom assembly 28 to monitor the movement of the boom. The sensors 82 can include any suitable sensing device for detecting data related to position, angle, displacement, distance, speed, acceleration of any component of the boom assembly 28. For example, in some embodiments, the sensor 82 may be light detection and ranging (LIDAR) sensor that are configured to emit one or more output signals for reflection off of the ground surface and receive or sense the return signal(s). Additionally, or alternatively, the movement sensor 82 may correspond to an imager (an area-type image sensor, such as a CCD or a CMOS image sensor, and image-capturing optics that capture an image of an imaging field of view), a radio detection and ranging (RADAR) sensor, a Hall effect sensor, a gyroscope sensor, a magnetometer sensor, an accelerometer sensor, a yaw-rate sensor, a piezoelectric sensor, a position sensor, a complementary metal-oxide-semiconductor (CMOS) sensor, a pressure sensor, a capacitive sensor, an ultrasonic sensor, or any other suitable type of sensors.

In some embodiments, a boom suspension 44 is configured to dampen movement of the frame 34 relative to the mast 40, thereby providing a more stable platform for the boom assembly 28. By providing additional stability, the spray quality index during a spray operation may be better maintained within a desired range. In some embodiments, the boom suspension 44 may allow for various damping levels based on an operator input and/or automatically altered by the controller 98 based on data received from the movement sensor 82. In some embodiments, the boom suspension 44 may be automatically adjusted based on data received from another system of the vehicle 10 as well. For instance, the damping level of the boom assembly 28 may be adjusted based on the vehicle 10 receiving instructions to alter the powertrain control system and/or the steering system 128 of the vehicle 10. Additionally, or alternatively, the damping level may be adjusted in response to data received from the weather station 112, from the positioning system, and/or from any other component of the vehicle 10 and/or the boom assembly 28.

In some embodiments, a powertrain control system 126 includes an engine output control system 150, a transmission control system 152, and a braking control system 154. Through the usage of any of these systems, the controller 98 may collect data related to one or more of the application variables, such as speed variations, steering variations, weather variations, and/or terrain variations that may cause the boom assembly 28 to move from its neutral position. In some embodiments, the controller 98 may provide notifications if one or more of variables within the powertrain control system 126 either deviates from a predefined threshold or if the actions taken by the powertrain control system 126 contribute to a spray quality index deviating from a predefined range and provide a mitigation action in response.

The engine output control system 150 is configured to vary the output of the engine to control the vehicle speed 10. For example, the engine output control system 150 may vary a throttle setting of the engine, a fuel/air mixture of the engine, a timing of the engine, and/or other suitable engine parameters to control engine output. In addition, the transmission control system 152 may adjust gear selection within a transmission to control the vehicle speed 10. Furthermore, the braking control system 154 may adjust braking force, thereby controlling the vehicle speed 10. While the illustrated powertrain control system 126 includes the engine output control system 150, the transmission control system 152, and the braking control system 154, it should be appreciated that alternative embodiments may include one or two of these systems, in any suitable combination. Further embodiments may include a powertrain control system 126 having other and/or additional systems to facilitate adjusting the vehicle speed 10.

In operation, the controller 98 may receive instructions to accelerate or decelerate the vehicle 10 through usage of the powertrain control system 126. In response to receiving instructions to accelerate the vehicle 10, a flow rate of the agricultural product can be increased through actuation of the flow control assembly 144. In response to receiving instructions to decelerate the vehicle 10 the flow rate of the agricultural product can be decreased through actuation of the flow control assembly 144. Additionally, or alternatively, the controller 98 can also be configured to manipulate the powertrain control system 126 to limit the vehicle acceleration, deceleration, or speed based on data regarding one or more application variables. For instance, the vehicle acceleration, deceleration, or speed may be limited to maintain the pump 146 within a predefined pump flow rate range. Additionally, or alternatively, the controller 98 can also be configured to manipulate the boom suspension 44, or any other component, in response to the powertrain control system. For example, in response to the powertrain control system altering the vehicle acceleration, deceleration, or speed, the boom suspension 44 may change from a first damping level to a second damping level.

Still referring to FIG. 5, a steering system 128 is configured to control a direction of the vehicle 10 through manipulation of one or more wheels 14, 16 (or tracks). The steering system 128 may include a steering system sensor 82 to provide data related to an instantaneous steering direction of the vehicle 10 and/or a torque on the steering wheel 86 indicating an operator's intention for manipulating the steering system 128. The manipulation of the direction and speed of alteration are application variables that affect the spray operation and, therefore, the controller 98 may alter a system or component of the vehicle 10 in response changes in the steering system 128. For instance, in some embodiments, the controller 98 may adjust an agricultural product application system 124 by altering stiffness of the boom assembly 28 or a flow rate of the product pump 146 in response to receiving instructions to change a direction of movement of the vehicle 10.

Still referring to FIG. 5, in some embodiments, the vehicle 10 may be equipped with a vehicle suspension 32, which may be configured as a passive, semi-active or active suspension system to isolate the cab 20 and/or the boom assembly 28 from vibrations caused by uneven terrain. Such suspension systems include vibration isolators mounted between the chassis 12 and the wheels 14, 16 (FIG. 2) of the vehicle 10. Passive systems use passive vibration isolators (e.g., rubber isolators, springs with friction or viscous dampers) to damp vibrations with different isolators used to damp different frequencies. Semi-active systems achieve control and isolation between the chassis 12 and the cab 20 by controlling a damper to selectively remove energy from the system in response to movement of the cab 20 as sensed by the sensors 82. Active systems use a sensor 82 to sense vehicle movement and a controller 98 to generate control signals for an actuator which applies a force to the cab 20 to cancel vibrations transmitted to the cab 20 and/or the boom assembly 28 by the chassis 12. In some embodiments, in response to the sensor 82 operably coupled with the suspension system detecting excess movement, the controller 98 may adjust the vehicle suspension 32, which in turn, may reduce movement of the boom assembly 28 thereby increasing a spray quality index. In addition, in some instances, the suspension system may be altered in response to receiving instructions to accelerate or decelerate the vehicle 10 and/or one or more of the application variables exceeding a predefined threshold and/or deviating from a predefined range.

Figure 6:
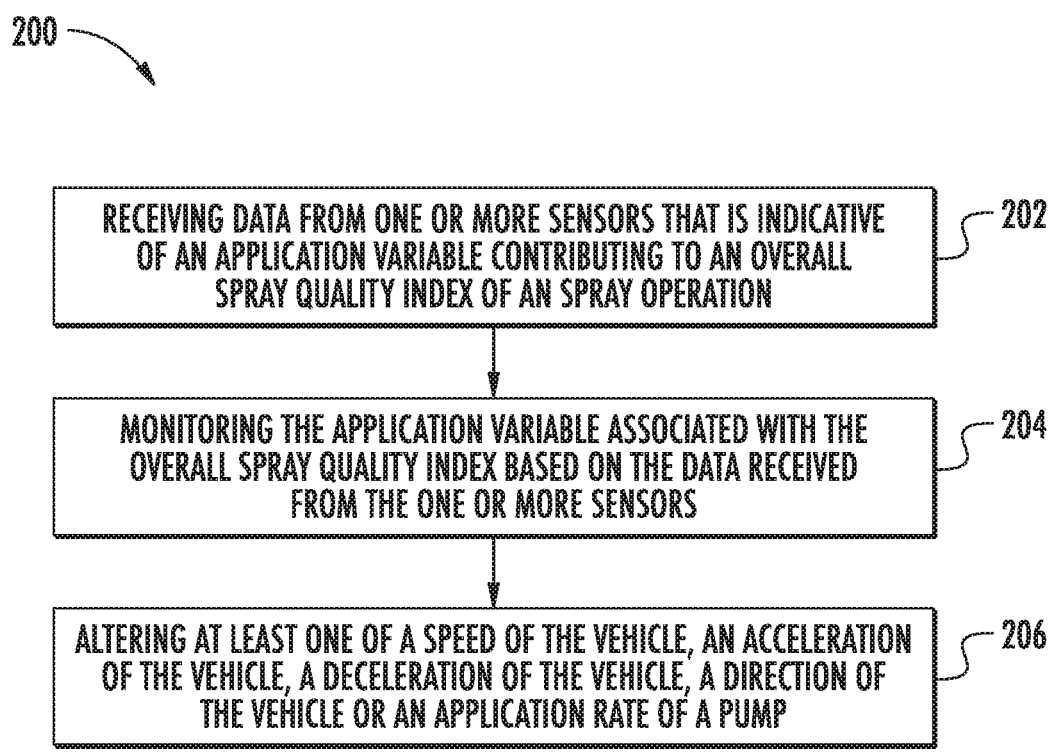
FIG. 6 illustrates a flow diagram of some embodiments of a method for mitigating deviations in a spray quality index during a spray operation of an agricultural product in accordance with aspects of the present subject matter.

Referring now to FIG. 6, a flow diagram of some embodiments of a method 200 of for mitigating misapplications of an agricultural product during a spray operation within a field using a work vehicle 10 is illustrated in accordance with aspects of the present subject matter. In general, the method 200 will be described herein with reference to the vehicle 10, the boom assembly 28, and the system 96 described above with reference to FIGS. 1-5. However, it should be appreciated by those of ordinary skill in the art that the disclosed method 200 may generally be utilized to monitor one or more application variables of any suitable applicator associated with any suitable agricultural vehicle 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and or adapted in various ways without deviating from the scope of the present disclosure.

As shown in FIG. 6, at (202), the method 200 may include receiving data from the one or more sensors 82 that is indicative of an application variable contributing to an overall spray quality index of a spray operation. For instance, as indicated above, the spray quality index may be affected by forces applied to the chassis 12 of the vehicle 10 which, in turn, are transmitted to the boom assembly 28. In addition, the spray quality index may be affected by movement of the vehicle 10 and/or the boom assembly 28, which can be caused by surface bump and/or uneven terrain. Furthermore, inclement weather, among other variables, may also affect the boom assembly 28, and therefore, the spray quality index.

Additionally, at (204) the method may include monitoring the application variable associated with the overall spray quality index based on the data received from the one or more sensors 82. For instance, as indicated above, the controller 98 may determine that a change has occurred in relation to one or more variables that affect the spray quality index. In response, at (206) the method may include altering at least one of a vehicle speed 10, an acceleration of the vehicle 10, a deceleration of the vehicle 10, or an application rate of a pump 146 based on a change in the overall spray quality index. Additionally, or alternatively, the method may include altering other various components of the vehicle 10 or boom assembly 28 to mitigate deviations in the spray quality index. For example, a vehicle suspension 32, an agricultural product application system 124, a powertrain control system 126, and/or a steering system 128 may have one or more components therein altered. Additionally or alternatively, altering the application rate of a pump 146 based on a change in the overall spray quality index can be accomplished by increasing a flow rate of the agricultural product through actuation of a flow control assembly 144 in response to receiving instructions to accelerate the vehicle 10 and decreasing the flow rate of the agricultural product through actuation of the flow control assembly 144 in response to receiving instructions to decelerate the vehicle 10.

In some embodiments, the method may also include altering a boom suspension damping level based on a change in the overall spray quality index. In addition, the method may further include altering the stiffness of the boom assembly 28 or altering the flow rate of the pump 146 in response to receiving data indicative of a change in weather as indicated by a weather station 112 commutatively coupled with the controller 98.

In various embodiments, the method may also include altering a damping level of a vehicle suspension 32 in response to receiving instructions to alter a vehicle speed, a vehicle acceleration/deceleration, or a vehicle direction. Furthermore, the method may also include altering a function of a powertrain control system 126 and/or a steering system 128 in response to receiving data indicative of a spray quality index deviating from a predefined range.

It is to be understood that the steps of the method 200 is performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein, such as the method 200, is implemented in software code or instructions which are tangibly stored on a tangible computer readable medium. The controller loads the software code or instructions via a direct interface with the computer readable medium or via a wired and/or wireless network. Upon loading and executing such software code or instructions by the controller, the controller may perform any of the functionality of the controller described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural vehicle comprising:
   a chassis operably coupled with a powertrain control system;
   a boom assembly operably coupled with the chassis;
   one or more nozzles positioned along the boom assembly;
   a flow control assembly configured to selectively dispense an agricultural product from a tank through the one or more nozzles; and a controller operably coupled with the powertrain control system and the boom assembly, the controller including a processor and associated memory, wherein the controller implements instructions stored in the memory to:
- receive instructions to accelerate or decelerate the agricultural vehicle;
- increase a flow rate of the agricultural product through actuation of the flow control assembly in response to receiving instructions to accelerate the agricultural vehicle;
- decrease the flow rate of the agricultural product through actuation of the flow control assembly in response to receiving instructions to decelerate the agricultural vehicle; and
- limit an acceleration of the agricultural vehicle or a deceleration of the agricultural vehicle based on a jounce of the boom assembly exceeding a movement range relative to the chassis.

2. The agricultural vehicle of claim 1, further comprising: a sensor operably coupled with the boom assembly and configured to capture data associated with one or more application variables, wherein the controller is further configured to modify the flow rate of the agricultural product in response to one of the one or more of the application variables deviating from a predefined range.

3. The agricultural vehicle of claim 2, wherein the sensor comprises at least one of a LIDAR sensor, a RADAR sensor, an imager, or an ultrasonic sensor.

4. The agricultural vehicle of claim 1, wherein the controller is further configured to alter the flow rate of the agricultural product based on at least one of an incorrect nozzle tip, an incorrect application rate, inclement weather meeting one or more criteria, boom assembly pressure exceeding a predefined pressure level, a boom assembly movement exceeding a movement limit, the agricultural vehicle exceeding a predefined vehicle speed, or a turning speed or radius deviating from a predefined range or speed defined by an upper threshold and a lower threshold.

5. The agricultural vehicle of claim 1, wherein the controller is further configured to limit an acceleration or a deceleration of the agricultural vehicle to maintain the flow control assembly within a predefined flow rate range of the agricultural product.

6. The agricultural vehicle of claim 4, wherein a damping level of a cab of the vehicle is altered due to movement of the boom assembly deviating a predefined range.

7. The agricultural vehicle of claim 1, further comprising: a boom suspension operably coupled with the boom assembly, wherein the controller is configured to alter a stiffness of the boom assembly when the controller receives the instructions to accelerate or decelerate the agricultural vehicle.

8. The agricultural vehicle of claim 1, wherein one or more application variables includes a predefined pump flow rate range.

9. The agricultural vehicle of claim 1, wherein the controller further implements instructions stored in the memory to:
- alter a boom suspension from a first damping level to a second damping level in response to receiving instructions to accelerate the agricultural vehicle or decelerate the agricultural vehicle.

10. An agricultural vehicle comprising:
- a chassis operably coupled with a powertrain control system;
- a boom assembly operably coupled with the chassis;
- one or more nozzles positioned along the boom assembly;
- a flow control assembly configured to selectively dispense an agricultural product from a tank through the one or more nozzles; and
- a controller operably coupled with the powertrain control system and the boom assembly, the controller including a processor and associated memory, wherein the controller implements instructions stored in the memory to:
  - receive instructions to accelerate or decelerate the agricultural vehicle;
  - increase a flow rate of the agricultural product through actuation of the flow control assembly in response to receiving instructions to accelerate the agricultural vehicle;
  - decrease the flow rate of the agricultural product through actuation of the flow control assembly in response to receiving instructions to decelerate the agricultural vehicle;
  - limit an acceleration of the agricultural vehicle or a deceleration of the agricultural vehicle based on one or more application variables; and
  - alter a boom suspension from a first damping level to a second damping level in response to receiving instructions to accelerate the agricultural vehicle or decelerate the agricultural vehicle.

11. An agricultural vehicle comprising:
- a chassis operably coupled with a powertrain control system;
- a boom assembly operably coupled with the chassis;
- one or more nozzles positioned along the boom assembly;
- a flow control assembly configured to selectively dispense an agricultural product from a tank through the one or more nozzles;
- a sensor operably coupled with the boom assembly and configured to capture data associated with one or more application variables; and
- a controller operably coupled with the powertrain control system and the boom assembly, the controller including a processor and associated memory, wherein the controller implements instructions stored in the memory to:
  - receive instructions to accelerate or decelerate the agricultural vehicle;
  - increase a flow rate of the agricultural product through actuation of the flow control assembly in response to receiving instructions to accelerate the agricultural vehicle;
  - decrease the flow rate of the agricultural product through actuation of the flow control assembly in response to receiving instructions to decelerate the agricultural vehicle;
  - limit an acceleration of the agricultural vehicle or a deceleration of the agricultural vehicle based on a jounce of the boom assembly exceeding a movement range relative to the chassis; and
  - modify the flow rate of the agricultural product in response to one of the one or more of the application variables deviating from a predefined range.

* * * * *